(12) United States Patent
Atkinson (10) Patent No.: US 7,896,568 B2
(45) Date of Patent: Mar. 1, 2011

(54) ARTICULITE

(76) Inventor: Richard Warren Atkinson, Pageland, SC (US)

(*) Notice: Subject to any disclaimer, the term of this patent is extended or adjusted under 35 U.S.C. 154(b) by 388 days.

(21) Appl. No.: 12/111,987

(22) Filed: Apr. 30, 2008

(65) Prior Publication Data

US 2009/0225558 A1 Sep. 10, 2009

Related U.S. Application Data

(60) Provisional application No. 61/033,798, filed on Mar. 5, 2008.

(51) Int. Cl.
*B60Q 1/06* (2006.01)

(52) U.S. Cl. .................. 403/62; 403/54; 403/163; 248/160; 248/528; 362/427

(58) Field of Classification Search .......... 403/53, 403/54, 62, 91, 161, 162, 163; 248/160, 248/528; 16/366, 368, 369, 370; 362/427, 362/432

See application file for complete search history.

(56) References Cited

U.S. PATENT DOCUMENTS

| | | | | |
|---|---|---|---|---|
| 3,601,598 | A * | 8/1971 | Horn | 362/418 |
| 4,247,886 | A * | 1/1981 | Warshawsky | 362/427 |
| 4,361,980 | A * | 12/1982 | Chatani | 446/409 |
| 4,386,393 | A * | 5/1983 | Pike | 362/427 |
| 4,670,207 | A | 6/1987 | Yamada et al. | |
| 4,688,829 | A | 8/1987 | Shioda et al. | |
| 4,721,406 | A * | 1/1988 | Davis | 403/163 |
| 4,748,671 | A | 5/1988 | Wiegel | |
| 4,881,843 | A * | 11/1989 | Randleman | 403/92 |
| 5,342,137 | A * | 8/1994 | Peng | 403/164 |
| 5,449,207 | A | 9/1995 | Hockett | |
| 5,486,024 | A | 1/1996 | Dierdorf | |
| 5,795,657 | A | 8/1998 | Poicus et al. | |
| 5,887,909 | A | 3/1999 | Tokuda | |
| 6,125,509 | A | 10/2000 | Hartigan et al. | |
| 6,383,655 | B1 | 5/2002 | Moren | |
| 6,436,224 | B1 | 8/2002 | Nishimura et al. | |
| 6,471,363 | B1 * | 10/2002 | Howell et al. | 362/11 |
| 6,634,061 | B1 | 10/2003 | Maynard | |
| 6,902,200 | B1 * | 6/2005 | Beadle | 362/371 |
| 7,670,308 | B2 * | 3/2010 | Borschneck | 16/334 |
| 2003/0044553 | A1 | 3/2003 | Ramanathan et al. | |
| 2003/0047268 | A1 | 3/2003 | Korchnak et al. | |
| 2006/0061991 | A1 * | 3/2006 | Yeh | 362/250 |
| 2006/0191623 | A1 | 8/2006 | Lutz et al. | |
| 2006/0266476 | A1 | 11/2006 | Sehanobish et al. | |

* cited by examiner

*Primary Examiner*—Michael P Ferguson
(74) *Attorney, Agent, or Firm*—F. Rhett Brockington (57) ABSTRACT

A light on a self-supporting collapsible arm having a plurality of frictionally restrained articulating joints, where the frictional joint has a male half joint with a first plate and an annular shaft with an inner wider diameter. In the surface of the first plate is a first O-ring seated in a first groove. A matching female half joint has a second plate and coaxial to the bearing in the surface of the second plate is a second O-ring seated in a second groove. The opposing side of the second plate of the female half joint has a third O-ring in a third groove. The third O-ring tensions a snap pin that couples the male and female half joints. The snap pin has a head with a compressible ridge which expands when the snap pin is pushed in far enough to engage the inner wider diameter of shaft.

10 Claims, 10 Drawing Sheets

ARTICULITE

CROSS REFERENCE TO RELATED PATENT APPLICATIONS

The application claims the benefit of the priority filing date of the U.S. provisional utility patent application bearing the application Ser. No. 61/033,798, which was filed on Mar. 5, 2008.

BACKGROUND OF THE INVENTION

1) Field of the Invention

The invention relates generally to articulating joints, and more particularly to a novel O-ring friction joint, and an adjustable articulating light made therewith.

2) Prior Art

U.S. Pat. No. 6,125,509 to Hartigan et al teaches an electronic device (10) that has a foldable housing (11) including a base unit: (12) and a cover unit (14). The cover unit is rotatably joined to the base unit by a hinge mechanism. Within the cover unit is a frictional hinge mechanism including a cam member (30), a cam follower (32) and an o-ring (34). The cam member has an attachment post (38) connected to an attachment gear on base unit such that the cam member is fixed to the base unit. The cover unit rotates against noticeable friction produced by O-ring rubbing between cover unit and cam member while cover unit is at angles of rotation larger than a pre-set angle, and cover unit rotates against minimal friction at angles of rotation smaller than the pre-set angle. The friction allows cover unit to maintain a multiplicity of positions with respect to base unit within a pre-selected range of angles larger than pre-set angle. Note, the O-ring 34 is illustrated in FIG. 7 and FIGS. 11-14 in various embodiments to produce friction and to lock the screen at various angles.

U.S. Pat. No. 6,634,061 to Ian Maynard teaches a damped hinge comprising a first part: mounted to a second part to allow relative rotation between the first and second part; biasing means for providing rotational movement between the first and second part; wherein upon rotational movement between the first and second part the first and second parts are arranged to cooperate to dampen the rotational movement. See Col. 4 lines 40-55 where the embodiment has multiple O-rings and incremental friction.

U.S. Pat. No. 4,748,671 to Christopher D. Wiegel teaches a microphone boom hinge that is comprised of a pair of identical members disposed in locking interfitting relationship, each member having an end to be stationarily disposed on an end of a microphone boom and the other end having a pivot pin and an aperture on spaced apart longitudinally extending ears and configured to rotate about a transverse axis to provide for articulatory motion of an assembled boom. No O-ring articulation friction is taught.

SUMMARY OF THE INVENTION

The invention provides an apparatus that is a braked or frictional articulating joint. The joint can be combined with additional elements to form a self-supporting collapsible arm comprised of multiple articulating joints, wherein the self-supporting collapsible arm is applicable for a multitude of applications, including but not limited to an adjustable light on an articulating arm. The invented frictional articulating joint comprises a male half joint with a first plate having a first frictional surface and an extending annular shaft, wherein the annular shaft has a barrel with an entrance diameter and an expanded inner section with a wider diameter. Coaxial with the shaft and projecting above the first plate is an O-ring seated in a first groove in the first frictional surface of the male joint. A matching female half joint is comprised of a second plate having a second frictional surface with a bearing, where the bearing is appropriately sized to receive and support the shaft. The type of bearing is selected for the application, but normally a ball bearing is not required. Coaxial to the bearing is a second O-ring seated in a second groove in the second frictional surface, where the O-ring projects above the second plate. The first and second O-rings preferably do not overlap. The plates of the half joints are aligned and positioned such that the second frictional surface and the first frictional surface are face-to-face and coaxial. The plates are separated by the first O-ring and the second O-ring, which are in contact with the frictional surface of the respective opposing plates, and the plates rub against the opposing O-ring when rotated. In order to rotate or articulate there must be sufficient force to overcome the frictional resistance of the O-rings and the contacting opposing frictional surface. The present invention enables mechanical advantage through the utilization of larger diameter plates and larger O-rings to increase the resistance, and of course, addition O-rings can be added if required.

The present invention further comprises a tensioning device, where the tensioning device maintains the plates and O-rings in contact at a prescribed level of force. As will be seen the tensioning device by itself simultaneously also provides an incremental amount of resistance to rotation. The tensioning device comprises a snap pin that has a flanged cap-shaped end having a diameter wider than the diameter of the bearing, a neck with a diameter less than the entrance diameter of the barrel, and a head with a compressible ridge, said compressible ridge having a diameter greater than the entrance diameter of the barrel. The compressible ridge is elastic, and when pushed with sufficient force it will compress to the entrance diameter of the barrel. In operation the snap pin is positioned in the barrel far enough such that that the compressible ridge is engaged with the wider diameter inner section of the barrel, with the ridge toggle hooked into and holding the male shaft under tension. The tensioning device further comprises a third O-ring, a compressible washer or the like for positioning the snap pin and setting the level of tension. The third O-ring is nominally seated in a third groove coaxial with the bearing on the opposing side of the second plate. The flanged cap-shaped end is pressed in so that it contacts and deforms the third O-ring. The amount of friction in the joint is partially a function of the level of tension holding the two half joints together. The third O-ring is sized to set the desired level, of tension between the two, half joints. Furthermore, the invented O-ring joint enables a manufacturer to produce a wide range of frictional resistance to rotation through the selection of, only a couple of parts. The tensioning device itself also contributes slightly to the resistance as the flanged cap-shaped end rubs against the third O-ring, and the compressible ridge rubs against the barrel.

The snap pin preferably has an annular channel, which improves compressibility and allows electrical wire, fiber optic cable, data line, and the like to pass through the joint in a protected environment and with minimal abrasive rubbing. The joints can be combined with additional elements to form a self-supporting collapsible arm comprised of multiple articulating joints, wherein the self-supporting collapsible arm is applicable for a multitude of applications, including but not limited to an adjustable light on an articulating arm.

BRIEF DESCRIPTION OF THE DRAWINGS

The present invention is illustrated and described herein with reference to various figures, in which like references denote like components and/or parts, and in which:

FIG. 8 is a top and a side view of a tensioning device which is a snap pin, where the top view illustrates that the snap pin is annular, having a coaxial annular channel through which can be threaded with a wire, a data line, a fiber optic cable, and the like;

DETAILED DESCRIPTION

The illustrated embodiment is an apparatus 10 that is a braked or frictional articulating joint that is typically combined with an elongate strength member 50, which in turn are combined forming a plurality of articulating elements forming a self-supporting collapsible arm. The invented joints are applicable for a multitude of applications, including but not limited to an adjustable light on an articulating arm. The disclosed frictional articulating joint is an O-ring joint having a unique arrangement of O-rings and frictional surfaces, and the drawings further illustrate that the novel joint can be easily adjusted to provide various levels of resistance to rotation.

Figure 1:
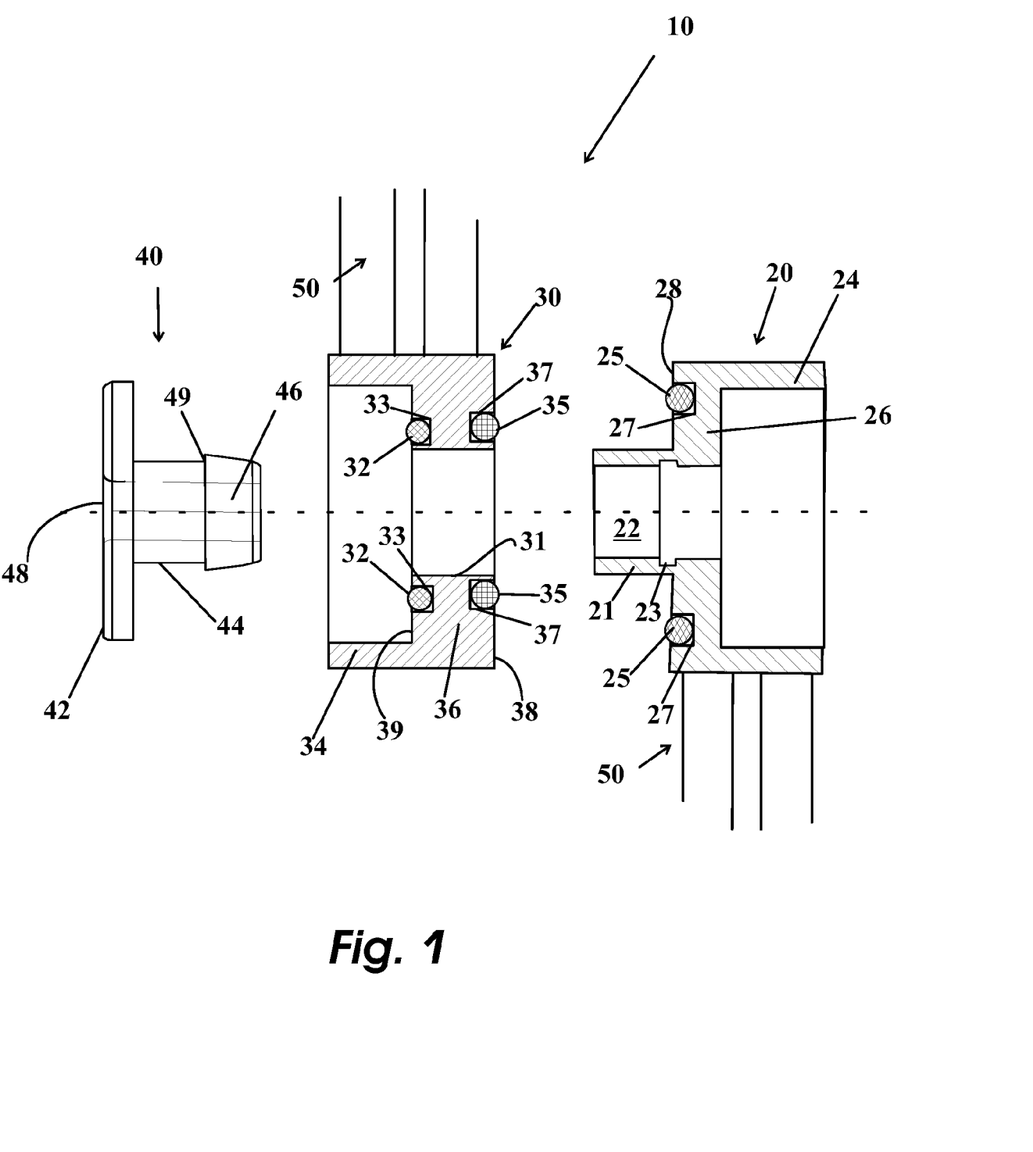
FIG. 1 is an exploded cross-sectional side view an O-ring joint 10.

Referring to FIG. 1, which is an exploded cross-sectional side view the O-ring joint 10, the illustrated frictional joint is comprised of a male half joint 20 with a first plate 26 having a first frictional surface 28 and an extending annular shaft 21, wherein the annular shaft has a barrel 22 with an entrance bore diameter and an expanded inner section 23 with a wider diameter. Coaxial with the shaft and projecting above the first plate is an O-ring 25 seated in a first groove 27 in the first frictional surface 28 of the male joint 20. A female half joint 30 is comprised of a second plate 36 having a second frictional surface 38 with a bearing 31, where the bearing is appropriately sized to receive and support the shaft. Coaxial to the bearing 31 is a second O-ring 35 seated in a second groove 37 in the second frictional surface 38, where the O-ring projects above the second plate. The first and second O-rings and their respective grooves have different diameters so that the O-rings do not overlap or rub against each other. Normally, the O-rings are sized so that the plates contact only O-rings, and not opposing plates. In the illustrated embodiment the diameter of the O-ring in the male half joint 20 is larger than the O-ring in the female half joint 30.

Figure 2:
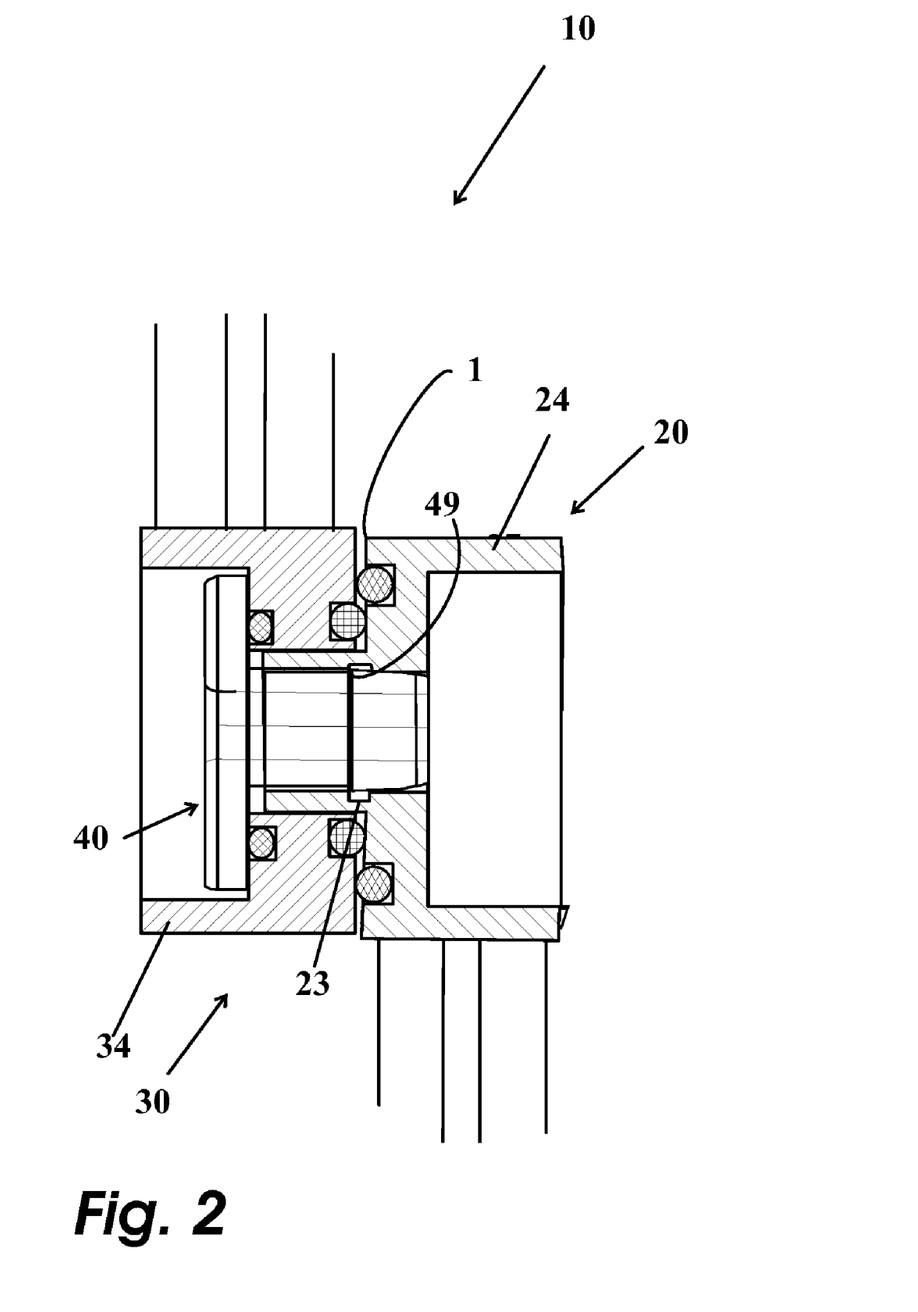
FIG. 2 is a cross-sectional side view the O-ring joint illustrated in FIG. 1, wherein the O-ring joint is assembled.

Referring to FIG. 2, the plates of the half joints are aligned and positioned such that the second frictional surface and the first frictional surface are face-to-face and coaxial. The plates are separated by the first O-ring and the second O-ring as indicated by 1. The plates and the first O-rings are in contact with the frictional surface of the respective opposing plates, and the plates rub against the opposing O-ring when rotated. Rotation requires sufficient force to overcome the frictional resistance of the O-rings and the contacting opposing frictional surface.

Figure 8:
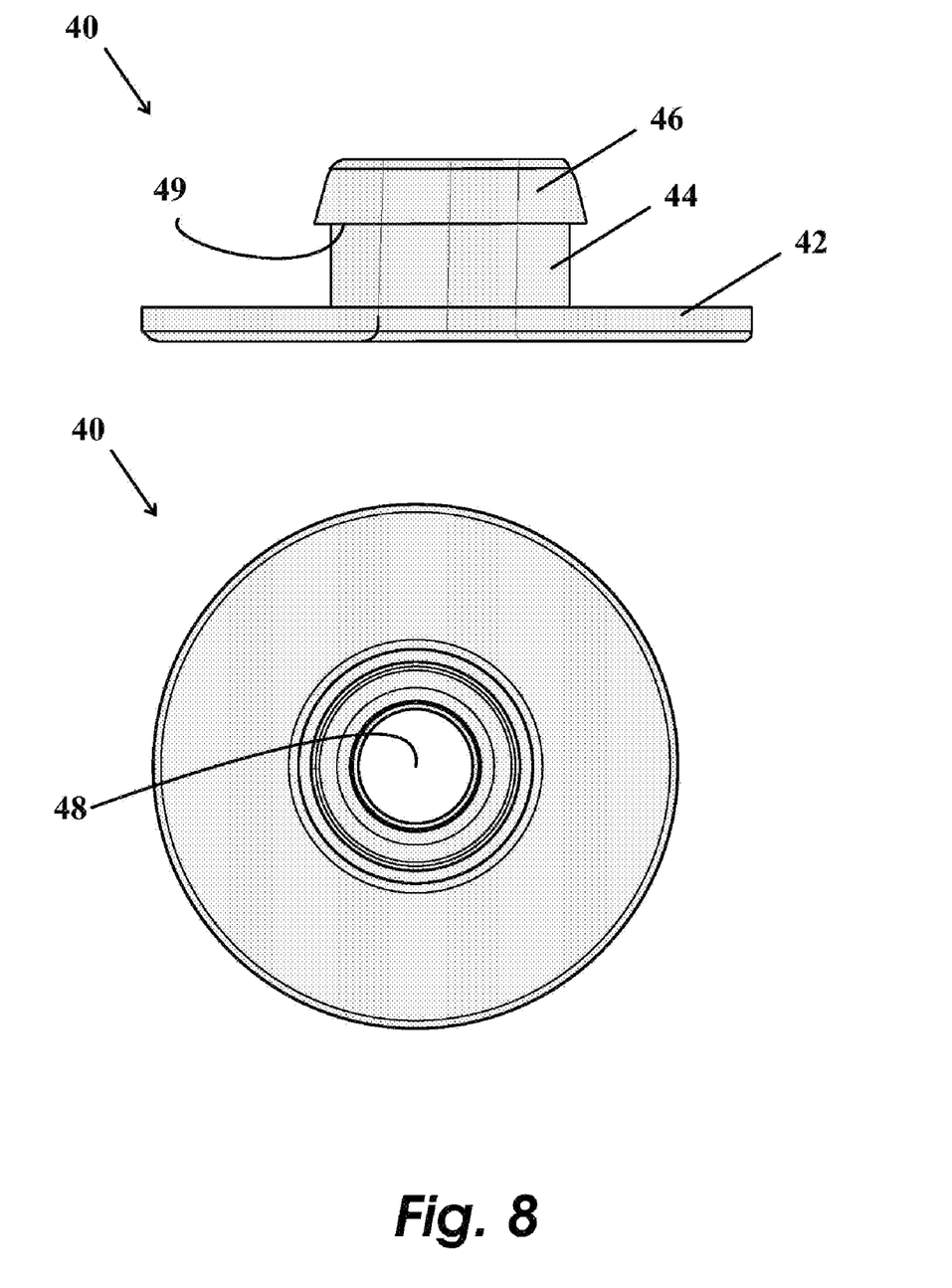

Referring again to FIG. 1, in the illustrated embodiment, the opposing side 39 of second plate 36 of the female half joint 30 has a third O-ring 32 that is seated in a third groove 33. The third O-ring function in part is to tension snap pin 40 that couples the male and female half joints as shown in FIG. 2. As shown in FIGS. 1, 2 and 8, the snap pin 40 has a flanged cap-like end 42 with a diameter greater than the diameter of the bearing 31, a neck 44 which has a diameter less than the bore (diameter) of the barrel 22, and a head 46 with a compressible ridge 49 which expands when engaging the wider diameter inner section 23 of the annular shaft 21. As shown in FIG. 2, during rotation the cap end 42 of the snap pin will traverse over the third O-ring 33 and the compressible ridge 49 will move on the enlarged interior section 23. This contact will produce some restriction, but is smaller than the plates in frictional contact with the first and second O-rings. Most frictional resistance is generated by the contact between the first and second O-rings and the opposing frictional surfaces. In part because the plates and O-rings are selected to optimize the frictional resistance, and in part because the plates have a much higher mechanical advantage as their diameter is much larger than the diameter of the bearing. Not accounting for any distortions in the plates, one would predict a doubling of the radius would produce more than twice the frictional resistance. The frictional resistance can also be increased by selecting a thicker third O-ring, as the thicker third O-ring causes the third O-ring to impart a higher level of tension on the plates of the joints, therein increasing the friction. The modulus and elasticity of the O-rings also affects the resistance, and to some degree the physical properties of the snap pin. Operationally, if the third O-ring is comprised of a relatively soft elastic rubber, then the same size O-ring will deform more easily, and the plates will be less tensioned, and friction will be lower. The amount of deformation of the compressible ridge on the snap pin can also affect the tension applied to the plates. In one embodiment the snap pin is comprised of nylon and the O-rings are comprised of butyl rubber.

Figure 3:
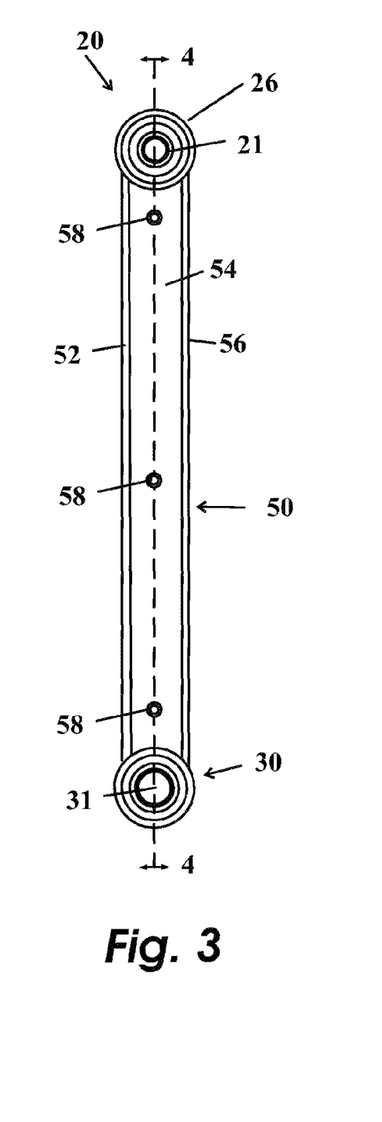
FIG. 3 is an overhead view of an articulating element, where the elongate strength member has sockets for a cover.
Figure 4:
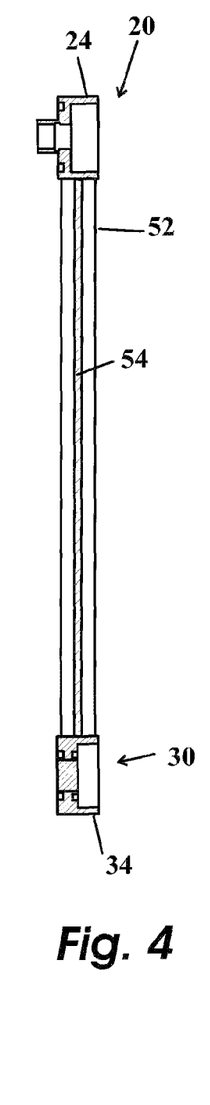
FIG. 4 is a cross-sectional side view of an articulating element taken along sectional line 4-4 of FIG. 3.
Figure 5:
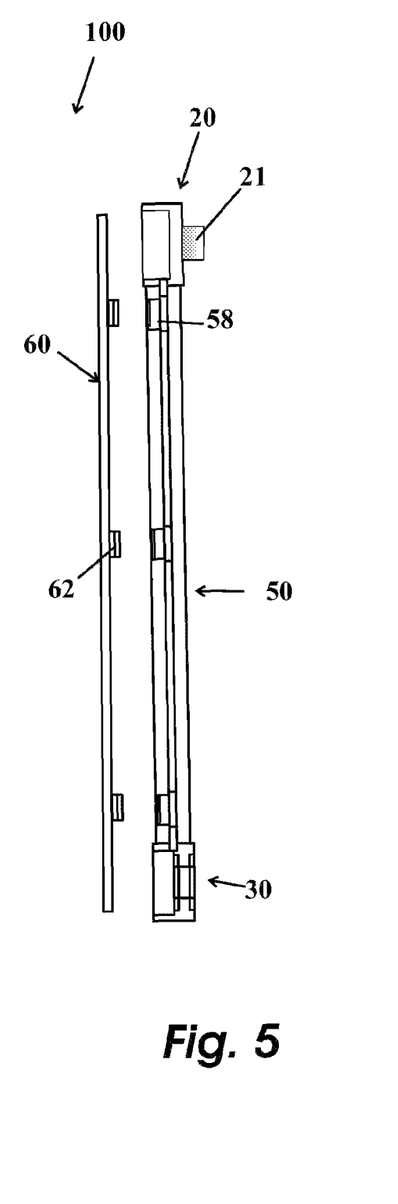
FIG. 5 is a side view of the articulating element illustrating the elongate strength member having a plurality of sockets depending from the center portion, wherein the sockets receive and support projections stemming from a cover, as shown adjacent to the articulating element, wherein the connecting projections emanating from the cover and aligned with the sockets, ready to be snapped into place.
Figure 6:
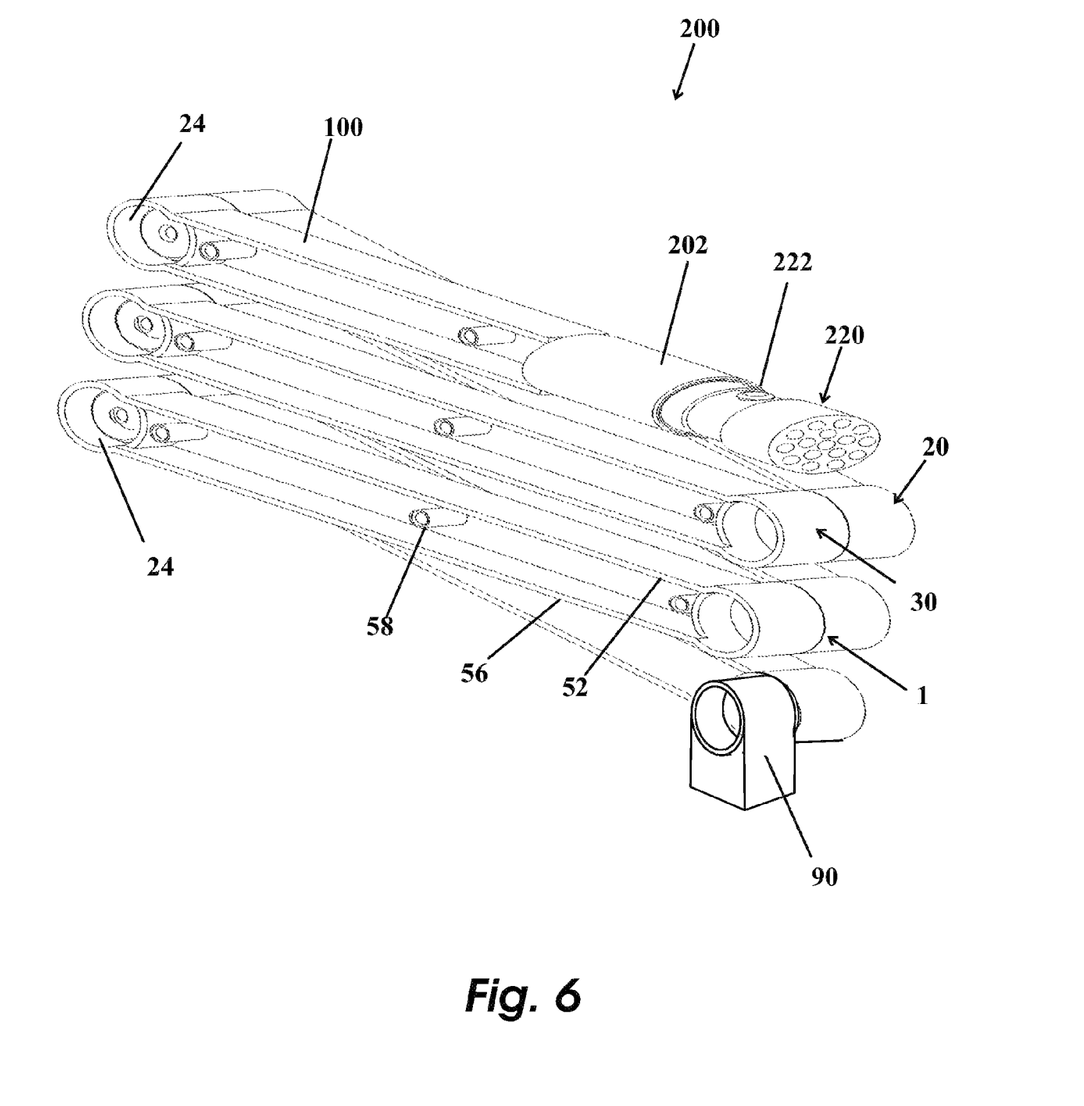
FIG. 6 is a perspective side view of an embodiment of the invention having a plurality of articulating U-shaped channel articulating elements that are fitted with covers (covers are not shown), wherein the arm of articulating elements is fitted with a light.

As illustrated in FIGS. 3, 4 and 5 the strength member 50 of an articulating element 100 has a male half joint 20 on one end and a female half joint 30 on the other end, where the shaft 21 and bearing 31 are on the same side, such that the articulating elements can be joined in stackable pairs, as shown in FIG. 6. The illustrated half joints have a perimeter wall, which imparts strength to the joint, as well as a barrier for protecting components within the joint. The female perimeter wall 34 is substantially identical to the male perimeter wall 24.

The articulating element 100 as illustrated in FIG. 3 has an elongate strength member 50 that is a U-shaped, having a left wall 52, a middle section 54 and a right wall 56 that is substantially coextensive with a half joint perimeter wall 24, 34. Referring to FIG. 4, which is a cross-sectional side view of an articulating element taken along sectional line 4-4 of FIG. 3, the male and female half joints are on the same side so that the articulating elements can stacked side-by-side in collapsible pairs. The elongate strength member 50 can alternatively be an I-beam or a ridged U-beam shape, or any variation thereof, with a center section, or alternatively with upper and lower horizontal sections. As seen in FIG. 3 the beam sections/walls 52, 54, 56 are coextensive with perimeter walls 24, 34 that make up the half joints. Cumulatively, the walls and sections provide reinforcing functional strength to the half joints and the elongate strength member, protection for the joints, and a protected passage for wires, cables and the like.

Referring to FIG. 5, the embodied articulating element illustrates an elongate strength member 50 with a plurality of sockets 58 depending from the middle section 54. The sockets 58 receive and support connecting projections 62 stemming from a cover 60. The cover 60 is shown from a longitudinal side view, where the connecting projections 62 are emanating from the cover 60 and aligned with the sockets 58, ready to be snapped into place.

Figure 9:
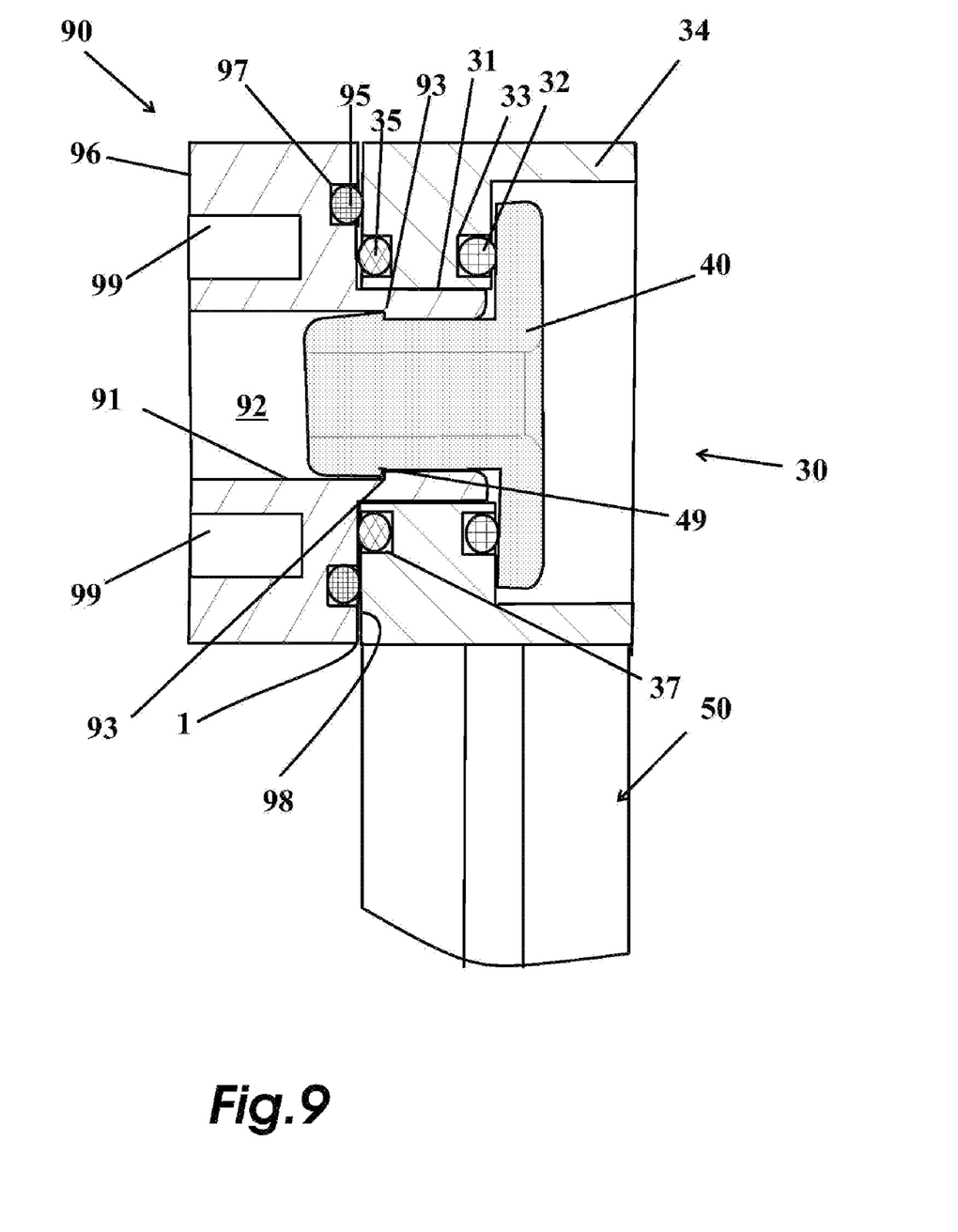
FIG. 9 is a cross-sectional view of a female half joint connected to a modified male half joint, wherein the modified male half joint has a mounting plate with fastening components for attaching it to a base.
Figure 10:
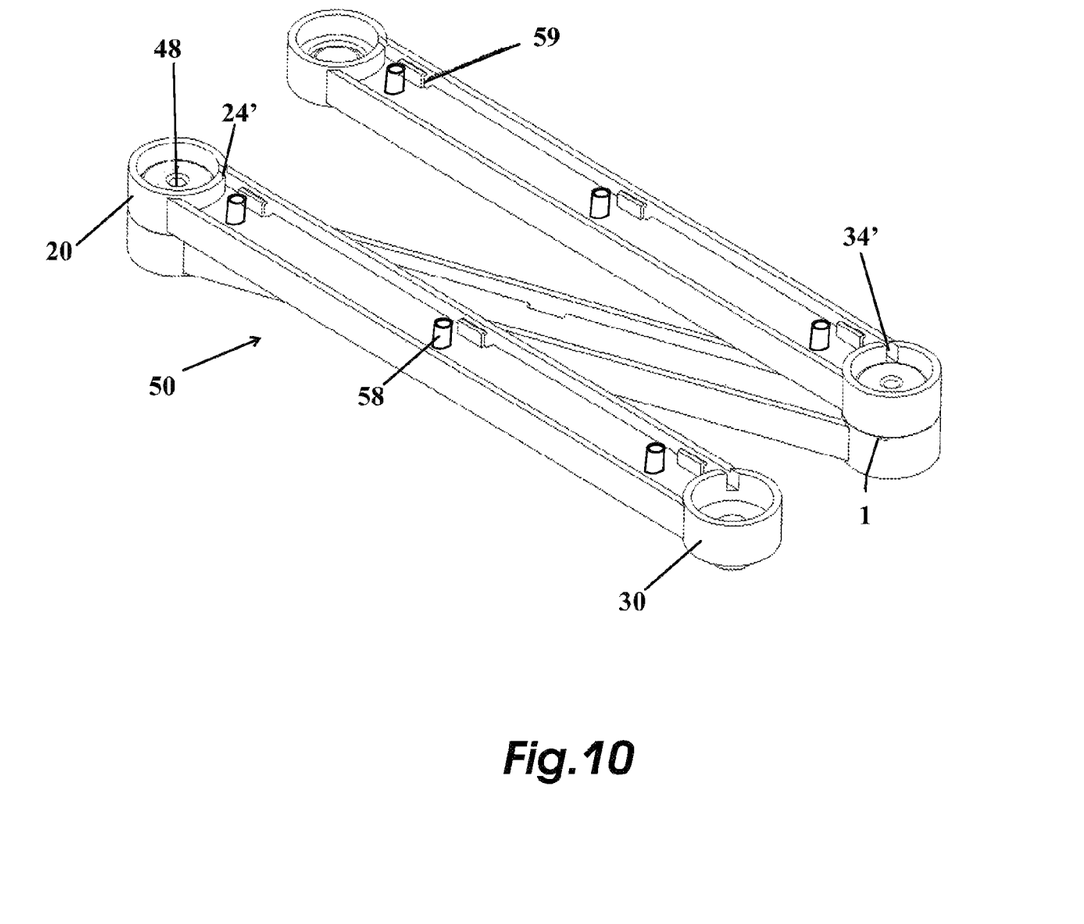
FIG. 10 is a perspective view of three articulating elements connected with an O-ring frictional joint, wherein the perimeter wall of each half joint has an aperture through which wire, fiber optic cable and the like can pass.

The invented joints are applicable for a multitude of applications, including an adjustable light 200 on an articulating arm, as shown in FIG. 6. In the illustrated embodiments an articulate, which is a light on articulated elements, there is a plurality of articulating U-shaped elements 100 substantially articulated to a collapsed position. The top element is a hybrid element adapted to terminate with a receptacle 202 for attaching a light 220. The illustrated light 220 is an LED light or an array of LED lights with a switch 222. The articulating elements are shown with the covers removed. The O-ring half joints are in frictional resistance at the rotation point 1, where a male half joint 20 contacts the female half joint 30. The bottom articulating element is connected to a mounting half joint 90, which attaches one of the half joints to a base structure. The mounting half joint 90 provides similar friction resistance, and can be either a male half joint or a female half joint, whatever is appropriate for providing a match that produces the desired frictional resistance. In the illustrated embodiment, the mounting half joint 90 is a modified male half joint, as illustrated in FIG. 9, and the articulating element has a female half joint. In the illustrated embodiment of FIG. 6, each elongate strength member has three sockets depending from the center portion for fastening a cover. There can be openings in the perimeter wall 24', 34' as shown in FIG. 10 that permits the articulate element to be fitted a wire, a data cable, a fiber optic cable, and the like; and secured with a bracket 59.

Figure 7:
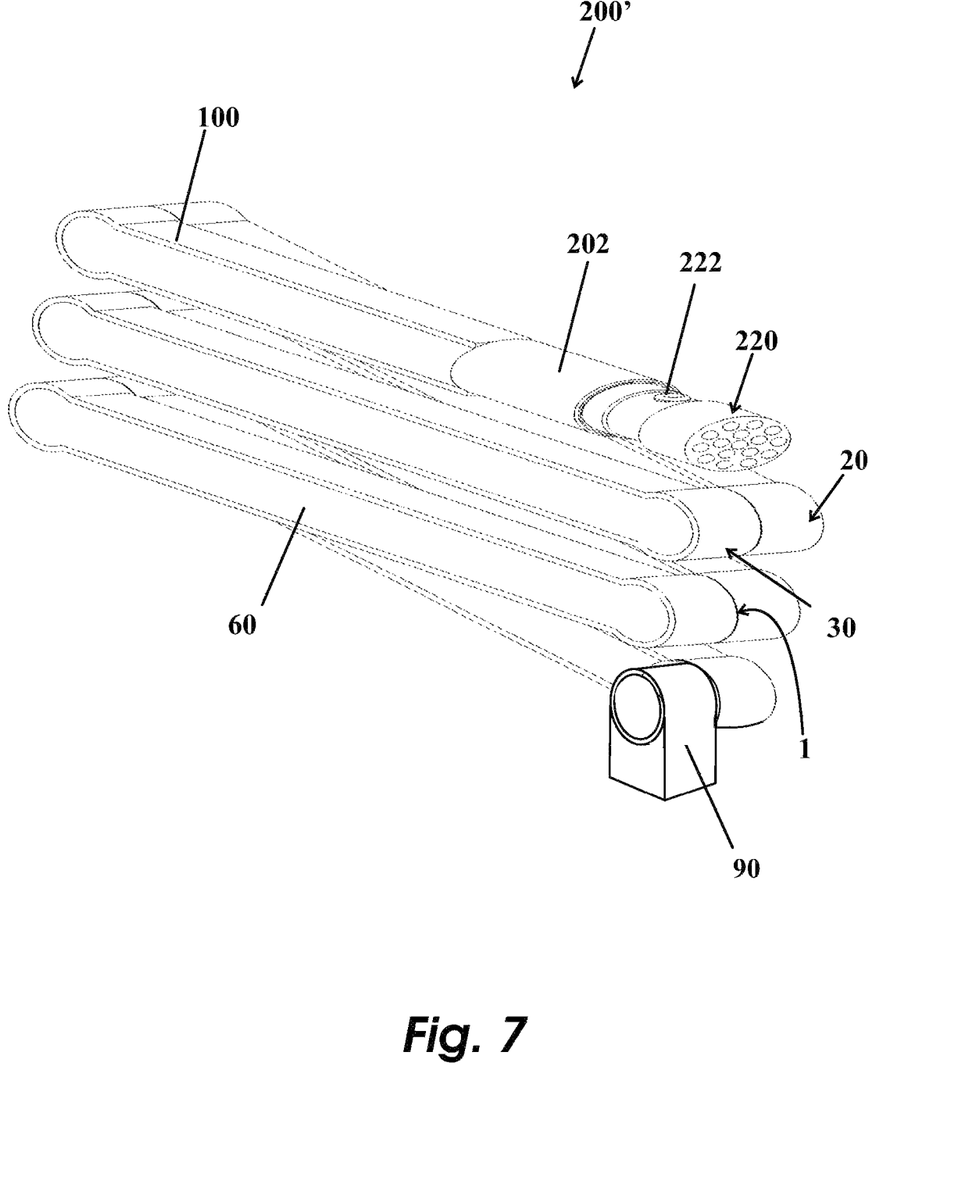
FIG. 7 is the articulating light illustrated in FIG. 6 wherein the articulating elements have covers.

Referring to FIG. 7 in the illustrated embodiment there are five articulating elements, each with a male and female O-ring frictional half joint. A pair of half joints 20, 30 forms a joint. The articulating elements 100 are in their most compact configuration, with a pair of connected elements stacked approximately side-by-side on top of each other. In their fully extended mode the elements are essentially in a self-supporting linear configuration. The top articulating element is a hybrid, modified to hold something like a light, a mirror, a ruler, a camera, a cable, a book. The illustrated version has a receptacle 202 that holds an LED light 220 with a switch 222. The covers 60 exclude ready access to the inner working components of the articulating elements, and add a finished look not typically found in articulating arms. The cover 60 also provides an occluded protective chamber for a wire, a data cable, a fiber optic cable, and the like through the articulated apparatus.

In the illustrated embodiment each elongate strength member has three sockets depending from the center portion for fastening a cover. There is an opening in the perimeter wall that permits the invented articulite to be fitted with a wire, a data cable, a fiber optic cable, and the like. The covers are not shown in this embodiment, but they are illustrated in FIG. 7. The articulating elements are connected serially, through the male-to-female half joints, where the respective plates of the half joints are in frictional contact with the O-rings mounted on the opposing plate. In the illustrated embodiment the top articulating element is modified to have a receptacle 202 that holds a flashlight 220. An LED flashlight is shown. The button 222 to control the light is on top. The bottom articulating element is connected to a base (not shown) through a modified male half joint 90 that is mounted on the base. FIG. 9 has details of this connection.

Referring to FIG. 7 there are a plurality of articulating elements, each with a male and female O-ring frictional half joint. A pair of half joints forms a joint. The articulating elements are illustrated in their collapsed configuration, with a pair of connected elements stacked approximately side-by-side on top of each other. In their fully extended mode the elements are self-supporting linear configuration. The top articulating element is a hybrid, modified to hold something like a light, a mirror, a ruler, a camera, a cable, a book, enabling hands-free operation. A wireless light is illustrated. In 200', the covers are in place. They form closed chambers, which exclude access to the inner working components of the articulating elements, and add a finished look to the articulite. The covers provide occluded protective chambers for a wire, a data cable, a fiber optic cable, and the like through the articulated apparatus. FIG. 10 illustrates how the invention is uniquely suited to provide a protected passage for wire, a data cable, a fiber optic cable, and the like through the articulite. The snap pin is recessed in that it does not extend all the way through the barrel of the shaft. The recessed snap pin reduces rubbing and the accompanying abrasion that occurs with movement of articulating elements. The perimeter wall of the half joints has opening 24', 34' to receive the wires etc. (not shown). The snap pin 40 has an annular channel 48 that permits threading through the joint, instead of the conventional method where the wire is exposed. In the embodiment shown in FIG. 10 there are also brackets 59 to thread the wire, a data cable, a fiber optic cable, and the like through the articulating elements.

In a preferred embodiment, the snap pin 40 as shown in FIG. 8 has an annular channel 48, which improves the compressibility when coupling the half joints, and allows electrical wire, fiber optic cable and the like to pass through the joint. The side view of the snap pin 40 shows the flanged cap-shaped end 42 with a relatively short neck, and a tapered head 46 with a compressible ridge 49, such that when pressed through the barrel 22 the compressible ridge engages the enlarged interior section 23 of the annular shaft 21. The snap pin is installed by aligning the pin with the shaft of the male half joint, and applying sufficient pressure on the cap-shaped end that the conical head is pressed into the circular interior expansion section 23.

In the complete process of forming an articulating joint the female half joint is connected to the male half joint by positioning their respective plates and O-rings, and then inserting aligning and inserting the annular shaft 21 into the bearing 31. The grooves for the O-rings need not be as deep as illustrated, as the grooves serve merely as guides to retain the O-rings. The snap pin is then pushed through the bearing into the hollow shaft until the compressible ridge engages the circular interior expansion section of the shaft. The snap pin 40 is pushed with enough force to depress the third O-ring, which elastically distorts, therein maintaining tension on the snap pin after the compressible ridge 49 engages the interior expansion section 23.

FIG. 9 is a cross-sectional view of the female half joint of an articulating element connected to a mounting half joint 90, where the mounting half joint 90 is modified to attach the joint to a base. As previously stated, the illustrated mounting half joint 90 is a male half joint, but with a few alterations could be a female mounting half joint to match a male half joint on an articulating element. The modified male half joint 90 has a mounting plate 96 with fastening components 99 for attaching it to the base. The mounting plate 96 has a first frictional mounting surface 98 and a protruding annular mounting shaft 91 with mounting barrel 92 with an interior expansion mounting section 93 in the annular mounting shaft 91. Coaxial to the shaft is a first mounting O-ring seated in a first mounting groove in the first frictional mounting surface 98. The female half joint 30 is substantially the same as previously described. The snap pin 40 connects the female half joint to the mounting half joint 90. The first frictional mounting surface 98 of the mounting half joint 90 and the second frictional surface of the female half joint 30 are separated by the O-rings, and that separation is indicated by 1. The O-ring frictional resistance joint is as previously described.

Figure 11:
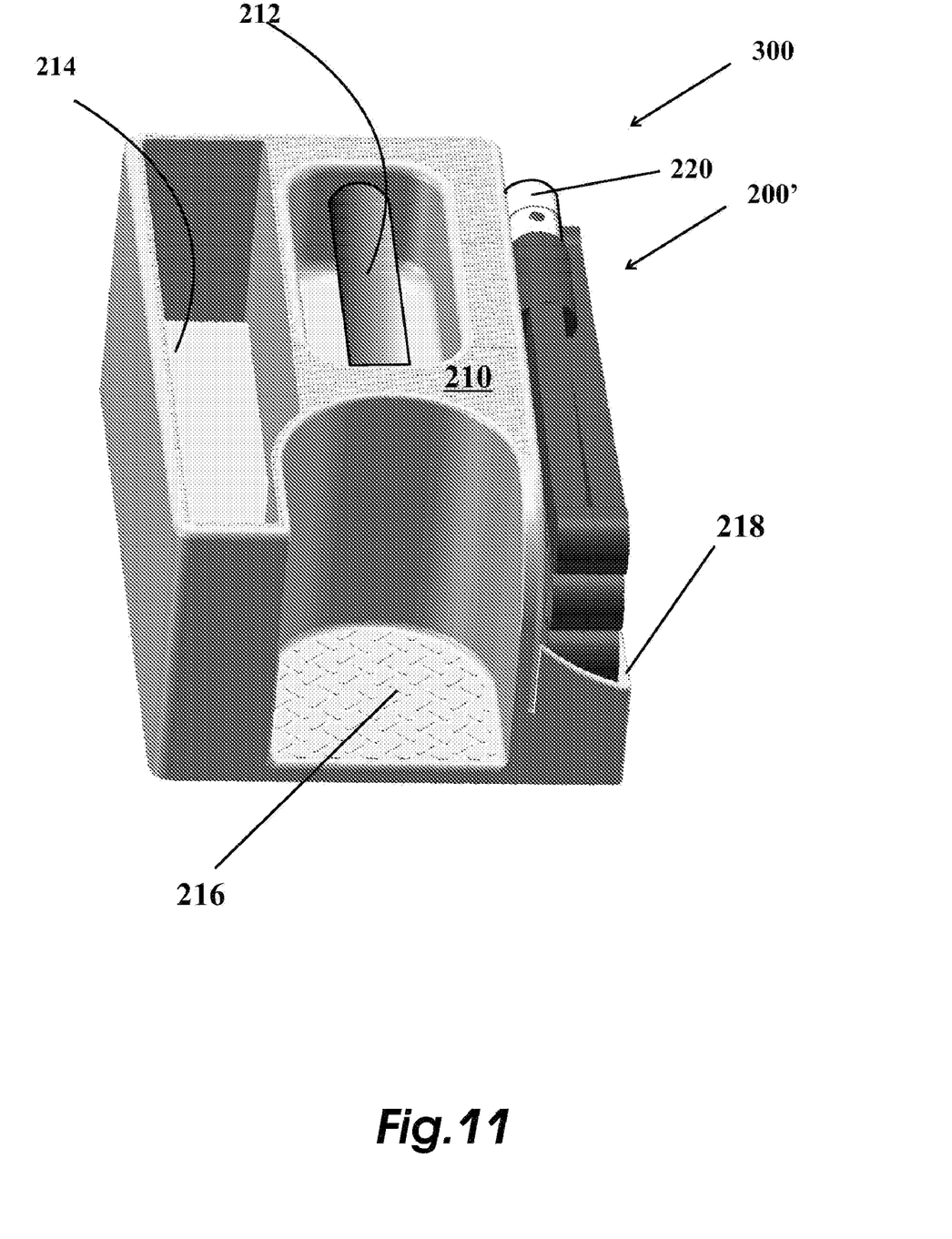
FIG. 11 is a perspective end view of an articulite apparatus comprised of articulating light fitted to a rectilinear structure where the articulating elements are collapsed.

Referring to FIG. 11, which is a perspective end view of an articulite apparatus 300 comprised of a rectilinear structure 210 fitted with the articulating light 200'. The rectilinear structure 210 has a retainer 218 where the articulating light 200' is attached and stored. The articulite apparatus 300 is further comprised of a handle 212, a partially open walled chamber 216, and open bin 214.

Figure 12:
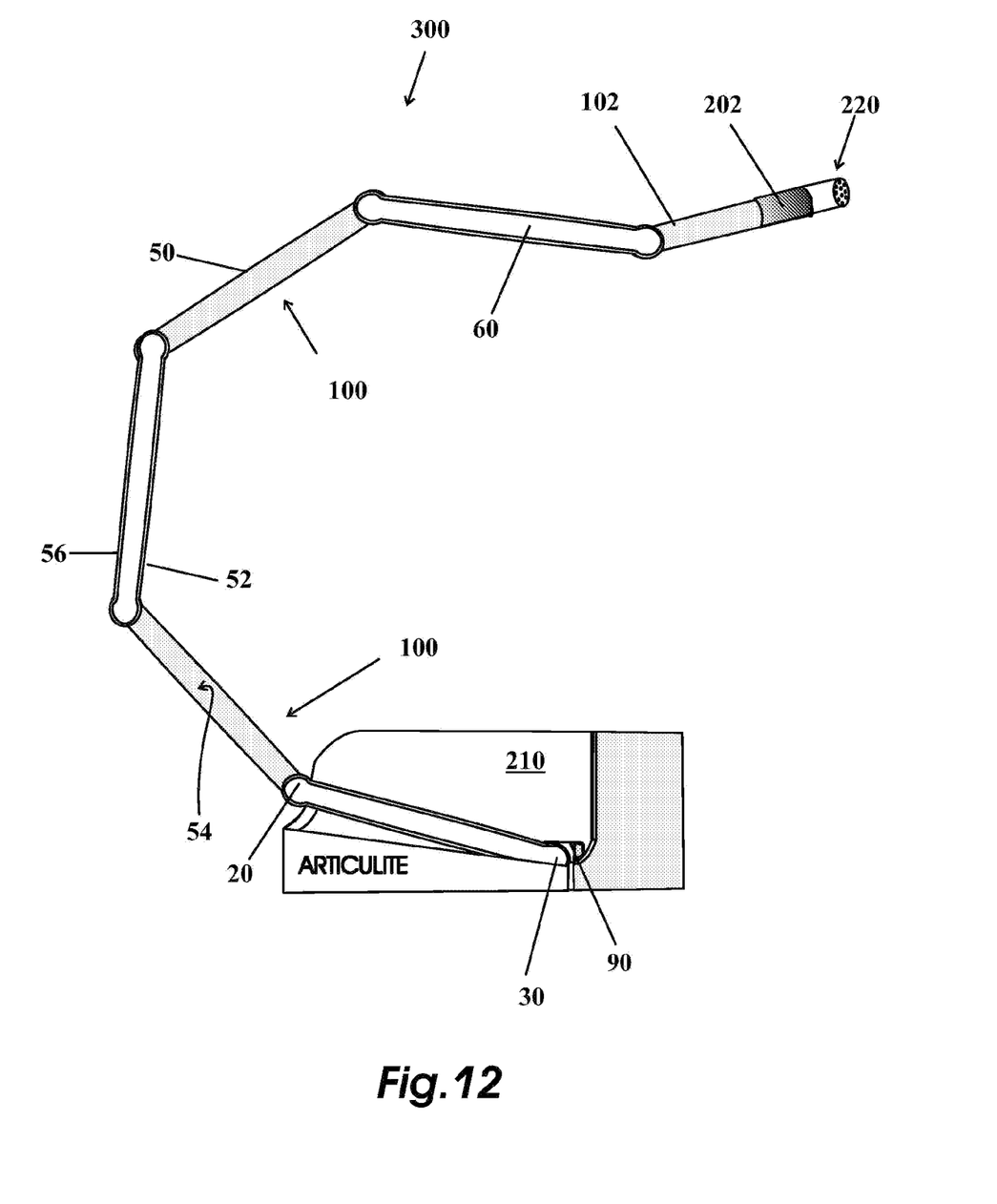
FIG. 12 is a side view of the articulite apparatus where the articulating elements are partially rotated to an extended position and the light is aimed forward.

FIG. 12 is a side view of the articulite apparatus 300. The articulating elements 100 are partially rotated to a C-shaped extended position and the light 220, which is an LED lamp, is aimed forward. The bottom articulating element is coupled to the mounting half joint 90 through a female half joint 30. The mounting half joint 90 is fastened to the bottom of the rectilinear structure. The top articulating element 102 is a hybrid element only having one half joint on one end and a light receptacle 202 on the other end. The articulating elements have a strength member 50 with a middle section 54, a right wall 56, a left wall 52, a cover 60, and pairs of half joints 20, 30. The serial end-to-end connected elements can be easily articulated to virtually any orientation, therein providing a holder for hands-free light and the like.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A frictionally restrained joint, said joint comprising:
   a male half joint comprised of a first plate having a first frictional surface from which protrudes an annular shaft, said annular shaft having a barrel with an entrance bore diameter and an inner section with a wider diameter, said first plate, having a first groove on said first frictional surface that is coaxial with the shaft and a first O-ring seated in the first groove, where said first O-ring has a thickness sufficient to protrude above the first frictional surface;
   a female half joint comprised of a second plate having a second frictional surface and a bearing extending through said second plate with a diameter, where the bearing is appropriately sized to rotatably receive and support the shaft, said second plate having a second groove on said second frictional surface that is coaxial with the bearing and a second O-ring seated in the second groove, where said second O-ring has a thickness sufficient to protrude above the second frictional surface, wherein said shaft is rotatably received within said bearing such that said first and second O-rings contact said second and first frictional surfaces, respectively; and
   a tensioning device, where said tensioning device couples the male and female half joints and maintains the frictional surfaces of the plates and the O-rings in contact at a prescribed level of force, thereby producing a desired level of frictional resistance to rotation;
   wherein said tensioning device is a snap pin, where said snap pin has a flanged cap-shaped end having a diameter wider than the diameter of the bearing, a neck with a diameter less than the entrance bore diameter, and an elastic compressible ridge, said compressible ridge having a diameter greater than the entrance bore diameter, wherein the snap pin is pushed through the barrel with sufficient force such that said compressible ridge is engaged with the wider diameter inner section and said flanged cap-shaped end contacts said second plate on a side opposite said second frictional surface.

2. The frictionally restrained joint according to claim 1 further comprising:
   a third O-ring seated in a third groove on a third side of the second plate opposing the second frictional surface, wherein the third O-ring protrudes above the third groove, therein further tensioning the snap pin.

3. The frictionally restrained joint according to claim 1, wherein said first and second plates have perimeter walls.

4. A light on a self-supporting collapsible articulating arm, said light comprising:
   a plurality of frictionally restrained joint articulating elements, wherein the articulating elements each comprise:
   an elongate strength member with a pair of half joints at opposing ends of said elongate strength member, where for each pair of adjacent articulating elements, a male half joint on one of said adjacent elements is joined with a female half joint on the connecting other one of said adjacent elements utilizing a tensioning device, therein forming a frictionally restrained joint, where said one element is capable of frictionally restrained articulation with respect to said other connecting element; wherein said male half joint is comprised of a first plate having a first frictional surface from which extends an annular shaft, said annular shaft having a barrel with an entrance bore diameter and an inner section with a wider diameter, said first plate having a first groove on said first frictional surface that is coaxial with the shaft and a first O-ring seated in the first groove, where said first O-ring has a thickness such that said first O-ring protrudes above the first frictional surface; wherein said female half joint is comprised of a second plate having a second frictional surface and a bearing extending through said second plate with a diameter, where the bearing is sized to rotatably receive and support the shaft, said second plate having a second groove on said second frictional surface that is coaxial with the bearing, and a second O-ring seated in the second groove, where said second O-ring has a thickness such that said second O-ring protrudes above the second frictional surface, wherein said shaft is rotatably received within said bearing such that said first and second O-rings contact said second and first frictional surfaces, respectively; and said tensioning device, where said tensioning device contacts said second plate on a side opposite said second frictional surface and extends through the barrel and is engaged with the wider diameter inner section to couple the male and female half joints and maintain the frictional surfaces of the plates, and the O-rings in contact at a prescribed level of force, thereby producing a desired level of frictional resistance to rotation;

a base with a mounting half joint connected to an end one of said articulating elements a light receptacle with a hybrid articulating element having a modified elongate strength member with a half joint connected to an opposite end one of said articulating elements; and a light connected to said light receptacle.

5. The light according to claim 4, wherein said tensioning device is a snap pin, where said snap pin has a flanged cap-shaped end having a diameter wider than the diameter of the bearing, a neck with a diameter less than the entrance bore diameter, and a head with an elastic compressible ridge, said compressible ridge having a diameter greater than the entrance bore diameter, wherein the snap pin is pushed through the barrel with sufficient force such that said compressible ridge is engaged with the wider diameter inner section and said flanged cap-shaped end contacts said second plate on a side opposite said second frictional surface.

6. The light according to claim 5 further comprising:

a third O-ring seated in a third groove on a third side of the second plate opposing the second frictional surface, wherein the third O-ring protrudes above the third groove, therein further tensioning the snap pin.

7. The light according to claim 5, wherein each said snap pin has an annular channel that extends axially through the snap pin, said annular channel providing a passage through the joint having a size sufficient to accommodate electrical wire, data cable, and fiber optic cable.

8. The light according to claim 4, wherein said light is an LED light or an array of LED lights.

9. The light according to claim 4, wherein said first and second plates have perimeter walls and each said elongate strength member has side walls, wherein said first and second plate perimeter walls are coextensive with said elongate strength member side walls, and a substantially flat cover that is affixed to the side walls, where said cover provides protection and limits access.

10. The light according to claim 9, wherein each said articulating element can further comprise wire guides, sockets for clasping projections from the cover, and interior openings in the perimeter wall to permit passage through the joint with electrical wire, data cable, and fiber optic cable.

* * * * *